(12) United States Patent
Tanaka et al.

(10) Patent No.: US 8,456,790 B2
(45) Date of Patent: Jun. 4, 2013

(54) WIND POWER GENERATION SYSTEM

(75) Inventors: Motofumi Tanaka, Yokohama (JP); Naohiko Shimura, Atsugi (JP); Shohei Goshima, Yokohama (JP); Hisashi Matsuda, Tokyo (JP); Hiroyuki Yasui, Yokohama (JP); Toshiki Osako, Kawasaki (JP); Masahiro Asayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/421,497

(22) Filed: Mar. 15, 2012

(65) Prior Publication Data

US 2012/0287549 A1    Nov. 15, 2012

(30) Foreign Application Priority Data

May 13, 2011    (JP) .............................. P2011-107812

(51) Int. Cl.
*H02H 1/04*    (2006.01)
(52) U.S. Cl.
USPC .............. 361/117; 361/56; 361/111; 361/220
(58) Field of Classification Search
None
See application file for complete search history.

(56) References Cited

U.S. PATENT DOCUMENTS

| | | | |
|---|---|---|---|
| 6,612,810 B1 * | 9/2003 | Olsen et al. | 416/95 |
| 7,377,750 B1 * | 5/2008 | Costin et al. | 416/146 R |
| 7,502,215 B2 * | 3/2009 | Krug et al. | 361/220 |
| 2007/0009361 A1 * | 1/2007 | Moller Larsen et al. | 416/146 R |
| 2010/0104436 A1 | 4/2010 | Herr et al. | |
| 2010/0123046 A1 | 5/2010 | Khozikov et al. | |
| 2011/0243737 A1 * | 10/2011 | Bell et al. | 416/146 R |

FOREIGN PATENT DOCUMENTS

| | | |
|---|---|---|
| EP | 2 180 182 A2 | 4/2010 |
| GB | 2469520 A | 10/2010 |
| JP | 2008-25434 | 2/2008 |

* cited by examiner

*Primary Examiner* — Stephen W Jackson
*Assistant Examiner* — Terrence Willoughby
(74) *Attorney, Agent, or Firm* — Finnegan, Henderson, Farabow, Garrett & Dunner, L.L.P.

(57) ABSTRACT

In one embodiment, a wind-power generating system 10 includes: a lightning protecting device including a receptor 70 provided on a blade surface and a lightning conductor 73 grounding the receptor 70; an airflow generating device 60 provided on the blade surface and including first and second electrodes 61, 62 separated via a dielectric 63; a discharge power source 65 including switches 90, 91 able to connect the first and second electrodes 61, 62 to output terminals 84, 85 respectively and a switch 92 able to connect the first or second electrode 61, 62 to a grounding conductor 100; and a thundercloud detecting device detecting information regarding thundercloud approach. When the information regarding the thundercloud approach is detected, the second electrode 62 is connected to the grounding conductor 100 and the first and second electrodes 61, 62 are disconnected from the output terminals 84, 85.

12 Claims, 7 Drawing Sheets

WIND POWER GENERATION SYSTEM

CROSS-REFERENCE TO RELATED APPLICATION

This application is based upon and claims the benefit of priority from the prior Japanese Patent Application No. 2011-107812, filed on May 13, 2011; the entire contents of which are incorporated herein by reference.

FIELD

Embodiments described herein relate generally to a wind power generation system.

BACKGROUND

Currently, in view of global warming prevention, introduction of renewable energy generation systems is in progress in the global scale. In such a circumstance, wind power generation is one of power generation methods which are being popularized. However, in Japan, the popularization rate of windpower generation is low compared to that in Europe or the like.

The reason for the difficulty of popularization of wind power generation in Japan is largely because of its geographical constraints. In particular, in Japan, wind force and direction change rapidly due to the mountain climate, making it difficult to maintain stable outputs in wind power generation. Such factors cause decrease in power generation efficiency per windmill, and consequently raise introduction costs of wind power generation systems.

To introduce large-scale wind power generation in a region where a wind velocity and direction change rapidly like in Japan, it becomes necessary to develop windmills which are variation resistant and overcome these problems. Accordingly, there is proposed a wind power generation system in which an airflow generation device generating plasma induced flow by plasma generated by applying a voltage between electrodes disposed to face each other via a dielectric is disposed on a blade surface of a windmill, to thereby enable control corresponding to variation of wind.

In a wind power generation system, blades are frequently damaged by lightning strikes. Therefore, if airflow generation devices including metal electrodes are applied to blades of a windmill, a current of lightning passes through the metal electrodes at the time of the lightning strikes, which may possibly cause not only a breakage of the electrodes and a power supply but also a damage of blade bodies near the airflow generation devices. In order to apply the airflow generation devices to an actual windmill, it is necessary to establish a structure for preventing the airflow generation devices from receiving the lightning strike and preventing a large current from passing therethrough, and a method for implementing the structure.

DETAILED DESCRIPTION

In one embodiment, a wind power generation system includes: a lightning protecting device including a lightning receiving part provided on a blade and a lightning conductor provided from the lightning receiving part to an underground via an interior of the blade and a windmill body to guide a current of lightning striking the lightning receiving part into the underground; and an airflow generation device including a first electrode provided on the blade and a second electrode apart from the first electrode via a dielectric and buried in the dielectric. The wind power generation system further includes: a voltage applying mechanism able to apply a voltage between the first electrode and the second electrode of the airflow generation device, able to electrically connect the first electrode to one terminal of a voltage applying part or a grounding conductor, and able to electrically connect the second electrode to another terminal of the voltage applying part or the grounding conductor; and a thundercloud detecting device detecting information regarding thundercloud approach.

When the information regarding the thundercloud approach is detected by the thundercloud detecting device, the second electrode is electrically connected to the grounding conductor and the electrical connection of the first electrode and the second electrode to the terminals of the voltage applying part is cut off.

Hereinafter, an embodiment of the present invention will be described with reference to the drawings.

Figure 1:
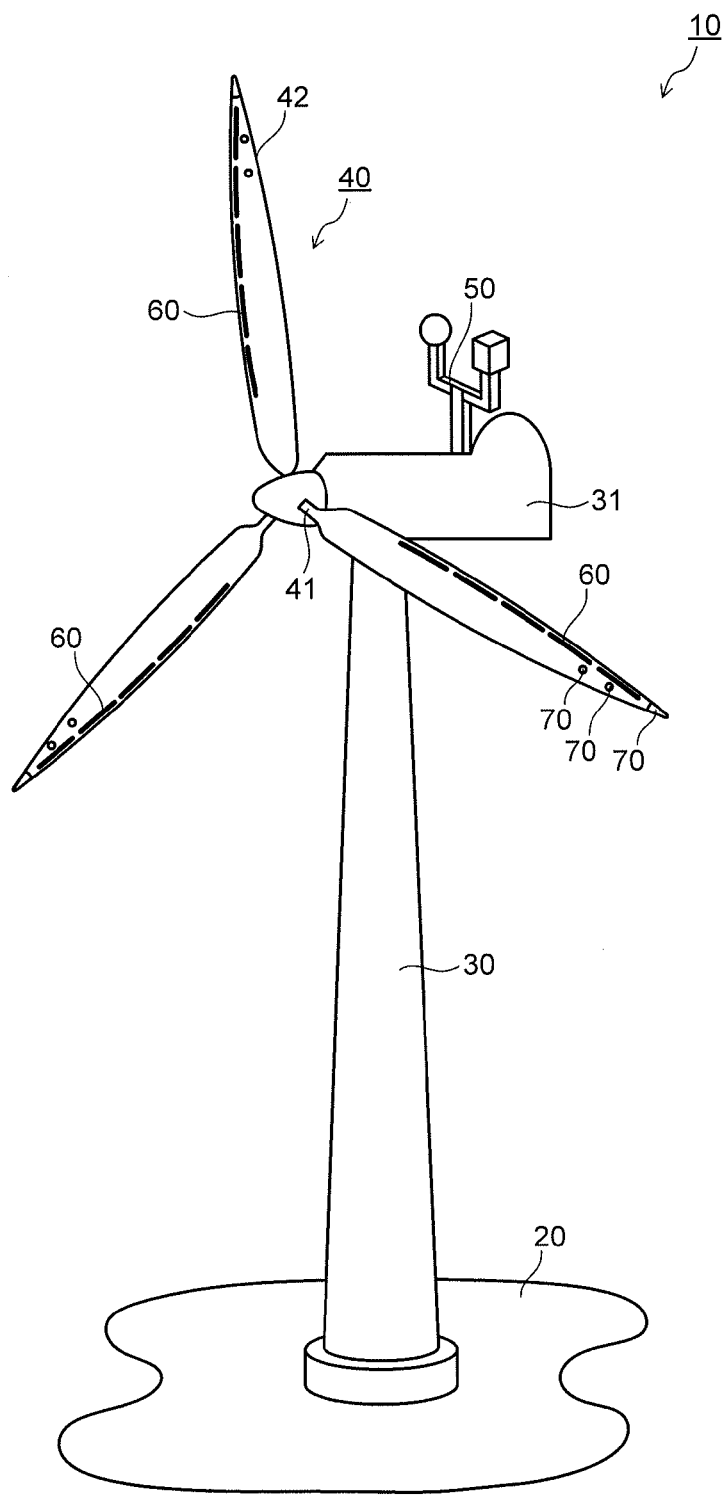
FIG. 1 is a perspective view showing a wind power generation system of an embodiment.
Figure 2:
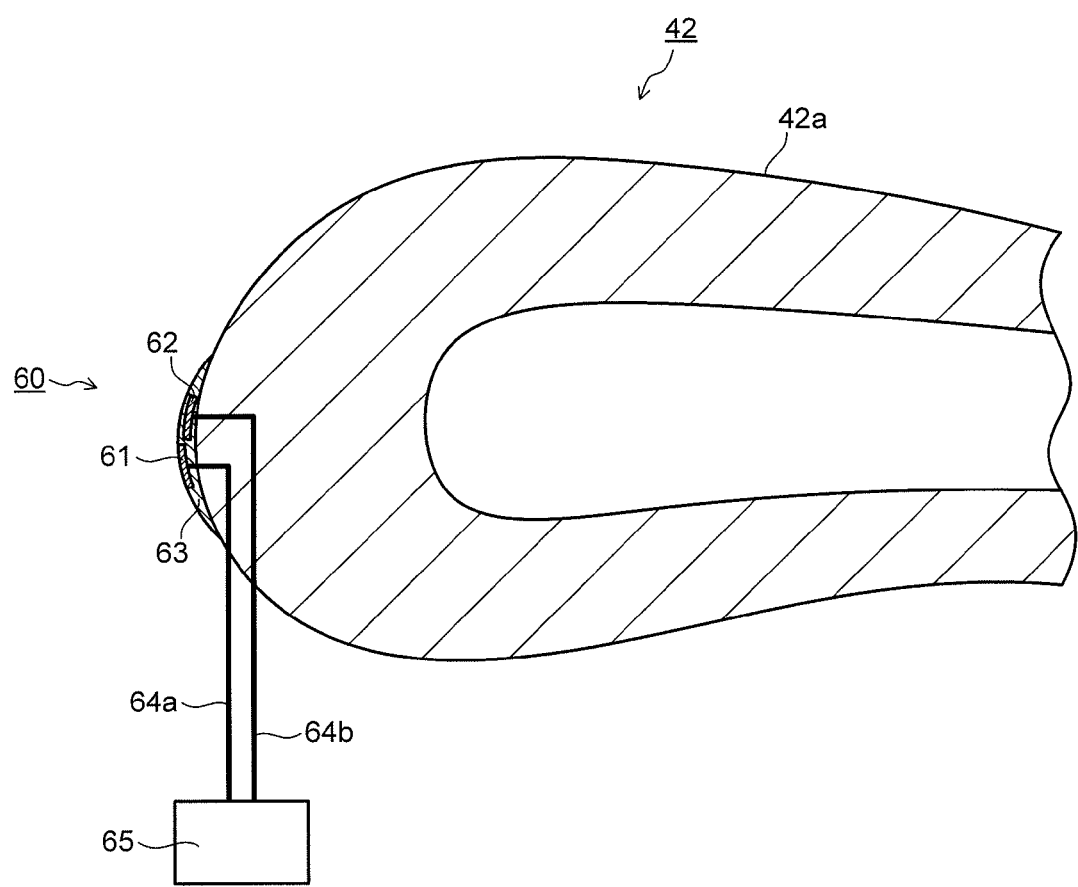
FIG. 2 is a view showing a cross section of a leading edge portion of a blade, for explaining an airflow generation device provided in the wind power generation system of the embodiment.
Figure 3:
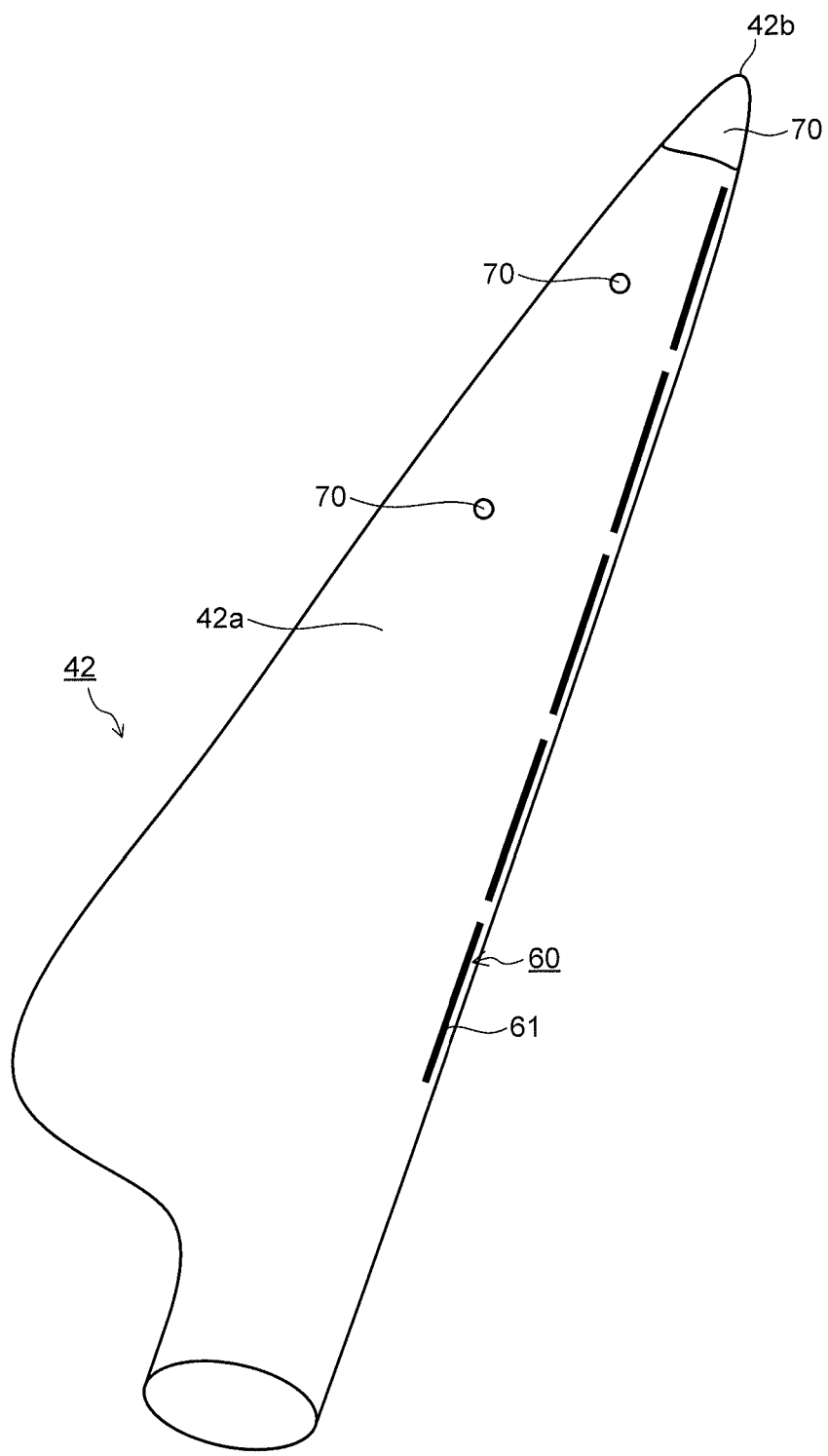
FIG. 3 is a perspective view of the blade provided in the wind power generation system of the embodiment.

FIG. 1 is a perspective view showing a wind power generation system 10 of the embodiment. FIG. 2 is a view showing a cross section of a leading edge portion of a blade 42, for explaining an airflow generation device 60 provided in the wind power generation system 10 of the embodiment. FIG. 3 is a perspective view of the blade 42 provided in the wind power generation system 10 of the embodiment. Note that in the following, the same constituent parts are denoted by the same reference numerals and symbols, and a redundant description thereof will be omitted or simplified.

As shown in FIG. 1, in the wind power generation system 10, a nacelle 31 housing a power generator (not shown) and so on is attached on a top portion of a tower 30 installed on a ground 20. Further, a rotor 40 is pivotally supported on a rotating shaft, of the power generator, projecting from the nacelle 31.

The rotor 40 includes a hub 41 and the blades 42 attached to the hub 41. Further, the blades 42 are provided so as to be changeable in pitch angle, for instance. Here, an example where the three blades 42 are provided is shown, but the number of the blades 42 may be at least two. On an upper surface of the nacelle 31, an aerovane 50 measuring direction and speed of the wind is provided as shown in FIG. 1.

On a leading edge portion of each of the blades 42, an airflow generation device 60 is provided as shown in FIG. 2. The airflow generation device 60 includes a first electrode 61 and a second electrode 62 disposed apart from the first electrode 61 via a dielectric 63. Further, the first electrode 61 is provided on a surface of the dielectric 63 and the second electrode 62 is buried in the dielectric 63. It should be noted that a dielectric material forming the dielectric 63 is not particularly limited, and it can be appropriately selected from generally-know dielectric materials made of solid, according to the purpose and environment of its use. Further, the dielectric 63 may be made of the combination of a plurality of kinds of materials.

It should be noted that the structure of the airflow generation device 60 is not limited to this. For example, the airflow generation device 60 may be structured so as not to protrude from a surface of the blade 42, with the structure including the first electrode 61, the second electrode 62, and the dielectric 63 being fittingly disposed in a groove portion formed in the blade 42. In this case, when, for example, the blade 42 is made of a dielectric material such as GFRP (glass fiber reinforced plastics) which is a glass fiber solidified by synthetic resin, the blade 42 itself can function as the dielectric 63. That is, the first electrode 61 can be directly disposed on the surface of the blade 42 and the second electrode 62 can be buried directly in the blade 42 so as to be apart from the first electrode 61.

Here, for example, it is possible to dispose the first electrode 61 so that a second electrode 62-side edge of the first electrode 61 is on the leading edge of the blade 42 and dispose the second electrode 62 at a position nearer to a suction side 42*a* of the blade 42 than the first electrode 61. It should be noted that the placement position of the airflow generation device 60 only needs to be a position where it can control the separation and so on occurring in the blade surface and is not particularly limited. For example, in order to accurately control a flow, the placement position of the airflow generation device 60 is preferably located at the leading edge portion of the blade 42.

As described above, in the airflow generation device 60, the first electrode 61 and the second electrode 62 are disposed so that a generated plasma induced flow flows from the first electrode 61 side toward the second electrode 62 side. For example, in the airflow generation device 60 shown in FIG. 2, the plasma induced flow flows from the leading edge of the blade 42 toward the suction side 42*a* of the blade surface.

For example, the plural airflow generation devices 60 are arranged independently in a blade span direction that extends from a root portion to an end portion of the blade 42 as shown in FIG. 1. In this case, the airflow generation devices 60 each can be controlled independently. For example, conditions (peak value, frequency, waveform, modulation frequency, duty ratio, and the like) of a voltage applied between the first electrode 61 and the second electrode 62 can be controlled independently for each of the airflow generation devices 60. For example, when the blade span is small, the single airflow generation device 60 may be disposed on the leading edge portion of the blade 42 so as to extend in the blade span direction.

The first electrode 61 and the second electrode 62 are electrically connected to a discharge power supply 65 functioning as a voltage applying mechanism, via cable lines 64*a*, 64*b* respectively, as shown in FIG. 2. Activating the discharge power supply 65 results in the application of the voltage between the first electrode 61 and the second electrode 62.

The discharge power supply 65 is capable of applying, for example, a pulsed (positive, negative, positive and negative bipolar (alternating voltage)) voltage that has undergone pulse modulation control, a voltage having an alternating (sinusoidal, intermittent sinusoidal) waveform, and so on, between the first electrode 61 and the second electrode 62. In this manner, the discharge power supply 65 is capable of applying the voltage between the first electrode 61 and the second electrode 62 while changing current and voltage characteristics such as voltage value, frequency, current waveform, duty ratio, and so on.

For example, when the plural airflow generation devices 60 are provided, one discharge power supply 65 may be provided per one airflow generation device 60, or the single discharge power supply 65 having a function capable of controlling the voltages of the respective airflow generation devices 60 independently may be provided.

Further, as shown in FIG. 3, receptors 70 functioning as lightning receiving parts are provided at a blade-span-direction tip portion 42*b* of the blade 42 and at tip portion 42*b*-side portions of pressure-side and suction-side surfaces of the blade 42. Note that FIG. 3 shows the suction-side surface of the blade 42.

The receptors 70 are provided to prevent the blade 42 from being damaged due to lightning striking an unintended portion of the blade 42. That is, the receptors 70 are provided to guide the lightning so as to prevent the lightning from striking other portions of the blade 42 and limit lightning-struck points in advance. The receptors 70 are preferably made of, for example, a metal material which is small in melting amount when struck by the lightning, and are made of, for example, a copper-tungsten alloy, aluminum, or the like.

The receptors 70 are each connected to a lightning conductor 73 (to be described later) provided to extend to the underground through the interior of the blade 42 and through the hub 41, the nacelle 31, and the tower 30 which function as the windmill body. A current of the lightning striking the receptor 70 is guided by the lightning conductor 73 to the underground. Incidentally, the rotating part and the static part are electrically connected by a brush or a discharge gap, for instance. The receptor 70 and the lightning conductor 73 function as a lightning protecting device.

Here, an electric wiring system of the wind power generation system 10 will be described.

Figure 4:
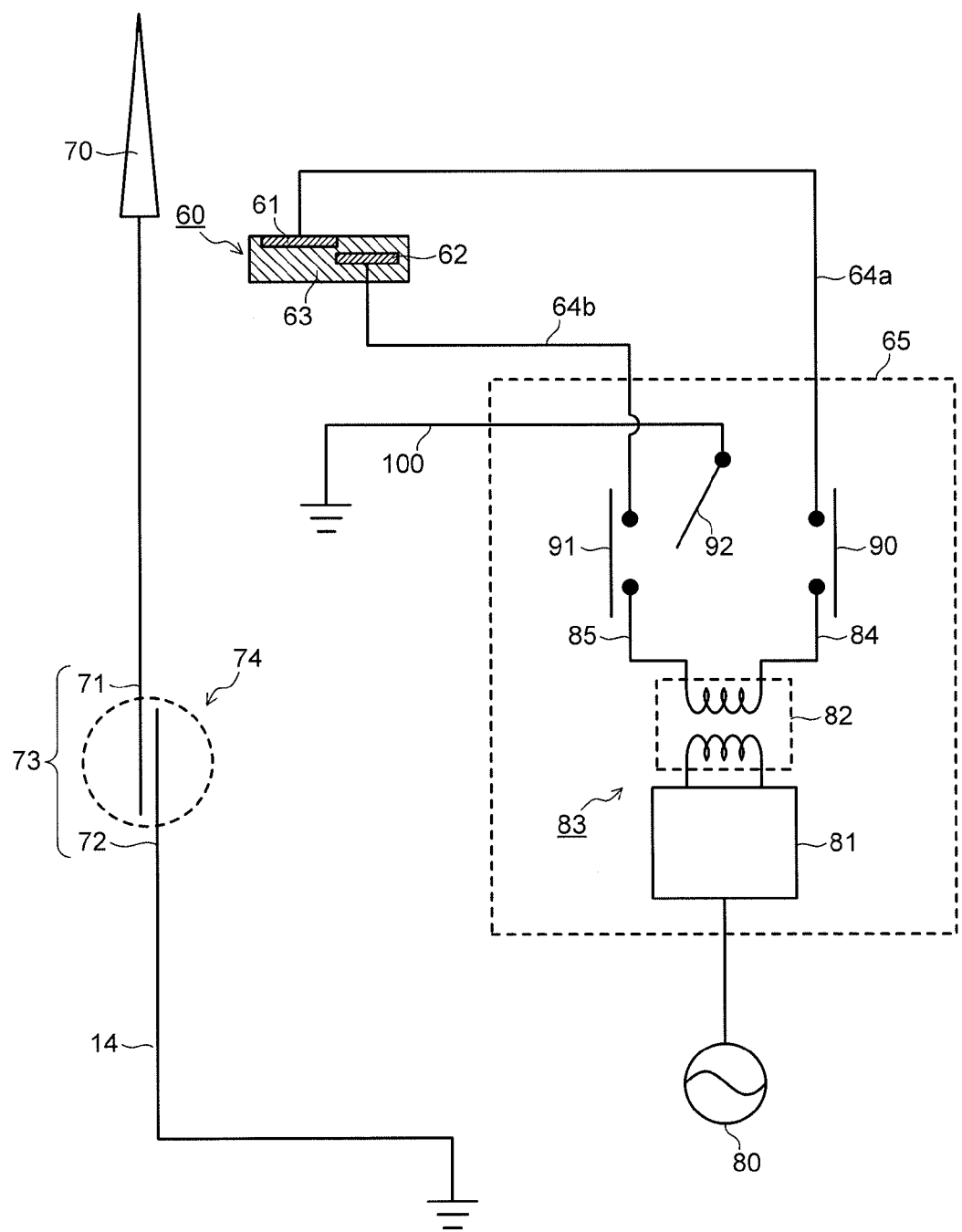
FIG. 4 is a diagram schematically showing an electric wiring system of the wind power generation system of the embodiment.

FIG. 4 is a diagram schematically showing the electrical wiring system of the wind power generation system 10 of the embodiment.

As shown in FIG. 4, the receptors 70 are each electrically connected to the lightning conductor 73 to be grounded. Here, the lightning conductor 73 is composed of a cable line 71 and a pull-down conductor 72. The cable line 71 is installed from the receptor 70 into the rotating part such as the blade 42. The pull-down conductor 72 has one end side electrically connected to the cable line 71 by, for example, a brush or a discharge gap in a connection part 74 and has another end side buried in the underground.

Since a large current as high as several ten kA passes through the lightning conductor 73 at the time of the lightning strike, the cable line 71 and the pull-down conductor 72 are designed to have diameters so that they can fully endure it. Further, connection resistance at the connection part 74 is designed to be low enough.

The discharge power supply 65 includes a voltage applying part 83 having an oscillator 81 generating a high-frequency voltage from power supplied from a primary power supply 80, and a transformer 82 transforming an output of the oscillator 81. The voltage applying part 83 has two output terminals 84, 85.

A cable line 64*a* connected to the first electrode 61 of the airflow generation device 60 is electrically connected to or disconnected from the output terminal 84 of the voltage applying part 83 by a switch 90 functioning as a first movable contact. A cable line 64*b* connected to the second electrode 62 of the airflow generation device 60 is electrically connected to or disconnected from the output terminal 85 of the voltage applying part 83 by a switch 91 functioning as a second movable contact.

The discharge power supply 65 further includes a grounding conductor 100 having one end side buried in the underground. The grounding conductor 100 is provided as a separate system from the lightning conductor 73. That is, the grounding conductor 100 and the lightning conductor 73 form grounding systems independent of each other. Incidentally, in a route of the grounding conductor 100, a part electrically connected thereto by a brush, a discharge gap, or the like may be provided, similarly to the lightning conductor 73.

The discharge power supply 65 further includes a switch 92 functioning as a third movable contact able to electrically connect the first electrode 61 or the second electrode 62 of the airflow generation device 60 selectively to the grounding conductor 100. That is, the switch 92 electrically connected to the grounding conductor 100 is provided to be capable of changing its electric connection destination between the cable line 64a and the cable line 64b.

In addition to the above-described structure, the wind-power generation system 10 further includes a thundercloud detecting device (not shown) detecting information regarding thundercloud approach. As the thundercloud detecting device, usable is, for example, a voltage detecting device detecting information regarding a voltage increase of the receptor 70 or the like in accordance with the thundercloud approach. As the voltage detecting device, a voltmeter is usable, for instance, and for example, it measures a voltage of the lightning conductor 73 (the cable line 71 or the pull-down conductor 72). That is, an example of the information regarding the voltage increase of the receptor 70 in accordance with the thundercloud approach is an output from the voltmeter.

Further, as the thundercloud detecting device, usable is, for example, a current detecting device detecting information regarding a current generated in the receptor 70 in accordance with a stepped leader. As the current detecting device, an ammeter is usable, for instance, and for example, it measures a current of the lightning conductor 73 (the cable line 71 or the pull-down conductor 72). That is, an example of the information regarding the current generated in the receptor 70 in accordance with the stepped leader is an output from the ammeter.

Further, as the thundercloud detecting device, usable is, for example, a receiving device receiving, by wire or by radio, information regarding the thundercloud approach, which information is output from an external part. As the receiving device, for example, a computer having a wireless LAN or a wired network function, or the like is usable. Information such as a lightning probability in a windmill installation area or the like is selected from information regarding lightning forecast received by the receiving device, and when it is determined that the probability is over a preset threshold value, the information regarding the thundercloud approach is detected. Then, when detecting the information regarding the thundercloud approach, the receiving device outputs a predetermined signal accordingly.

The thundercloud detecting device may be electrically connected to the switches 90, 91, 92 so that the switches 90, 91, 92 are directly operated based on an output signal of the aforesaid thundercloud detecting device.

Alternatively, the wind power generation system 10 may include a control device controlling the switches 90, 91, 92 of the discharge power supply 65 based on the information from the thundercloud detecting device. This control device is mainly composed of, for example, a computing device (CPU), a read-only memory (ROM), a random access memory (RAM), and so on, and the CPU executes various kinds of computations by using programs, data, and so on stored in the ROM and the RAM. The processing executed by the control device is realized by, for example, a computer device or the like.

The control device is connected to the thundercloud detecting device and the switches 90, 91, 92 so that electric signals can be output/input therebetween. Incidentally, the control device may have a function of controlling the output of the voltage applying part 83 to control the voltage applied between the first electrode 61 and the second electrode 62 of the airflow generation device 60.

The control device controls the switches 90, 91, 92 based on, for example, information such as the output signal output from the thundercloud detecting device, preset information relating to states of the switches 90, 91, 92 corresponding to the information output from the thundercloud detecting device, and so on. Examples of the information relating to the states of the switches 90, 91, 92 are information such as an ON state and an OFF state for the switches 90, 91, and the connection state with the cable line 64a or the cable line 64b for the switch 92. These pieces of information corresponding to the information output from the thundercloud detecting device may be stored in a memory of the control device, for instance.

Alternatively, a storage device or the like connected to the control device so that electric signals can be output/input therebetween may be separately provided, and the information relating to the states of the switches 90, 91, 92 corresponding to the information output form the thundercloud detecting device and so on may be stored in this storage device.

For example, when the thundercloud detecting device includes the aforesaid voltmeter measuring the voltage of the lightning conductor 73 (the cable line 71 or the pull-down conductor 72), the control device controls the switches 90, 91, 92 based on a signal output from the voltmeter and the preset information relating to the states of the switches 90, 91, 92 corresponding to the signal output from the voltmeter, which information is stored in the memory or the like.

As the preset information relating to the states of the switches 90, 91, 92 corresponding to the signal output from the voltmeter, a threshold value of the output from the voltmeter, the states that the switches 90, 91, 92 should have when the output is equal to or less than the threshold value or is over the threshold value, and so on are stored, for instance. For example, when determining that the output is over the threshold value based on the stored information, the control device controls the switches 90, 91, 92 so as to bring the electric wiring system to a state set for the time of the thundercloud approach.

When the thundercloud detecting device includes the aforesaid ammeter measuring the current of the lightning conductor 73 (the cable line 71 or the pull-down conductor 72), as the preset information relating to the states of the switches 90, 91, 92 corresponding to the signal output from the ammeter, a threshold value of the output from the ammeter, the states that the switches 90, 91, 92 should have when the output is equal to or lower than the threshold value or is over the threshold value, and so on are stored, for instance. For example, when determining that the output is over the threshold value based on the stored information, the control device controls the switches 90, 91, 92 so as to bring the electric wiring system to the state set for the time of the thundercloud approach.

When the thundercloud detecting device includes the aforesaid receiving device, the control device detects the information regarding the thundercloud approach based on the information regarding the lightning probability received by the receiving device as previously described. Then, when detecting the information regarding the thundercloud approach, the control device controls the switches 90, 91, 92 so as to bring the electric wiring system to the state set for the time of the thundercloud approach.

Next, the operation of the wind power generation system 10 will be described.

(Normal Operation Time)

First, the operation at the time of the normal operation when the thundercloud detecting device does not detect the information regarding the thundercloud approach will be described.

Figure 5:
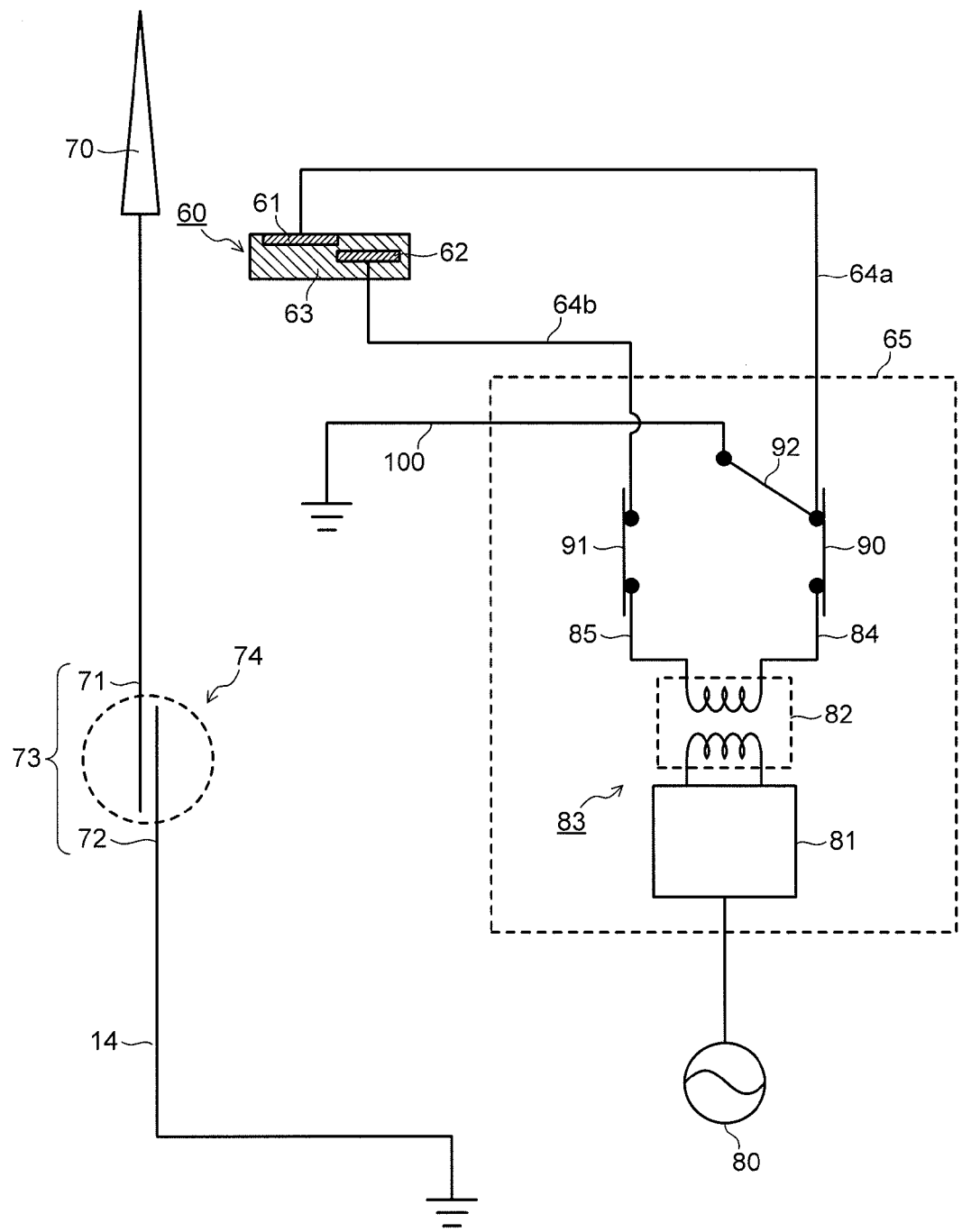
FIG. 5 is a diagram schematically showing the electric wiring system of the wind power generation system of the embodiment at the time of normal operation.

FIG. 5 is a diagram schematically showing the electric wiring system of the wind power generation system 10 of the embodiment at the time of the normal operation.

When the wind power generation system 10 is in normal operation, the switch 90 is turned on to electrically connect the cable line 64a to the output terminal 84 of the voltage applying part 83, and the switch 91 is turned on to electrically connect the cable line 64b to the output terminal 85 of the voltage applying part 83, as shown in FIG. 5. That is, the first electrode 61 of the airflow generation device 60 is electrically connected to the output terminal 84 of the voltage applying part 83, and the second electrode 62 is electrically connected to the output terminal 85 of the voltage applying part 83, so that the airflow generation device 60 is brought into an operable state.

Further, the switch 92 electrically connected to the grounding conductor 100 is electrically connected to the cable line 64a. That is, this produces a state where the first electrode 61 of the airflow generation device 60 is electrically connected to the grounding conductor 100.

In the above-described state of the electric wiring system, when the power is supplied from the primary power supply 80, the high-frequency voltage is oscillated from the oscillator 81, and a potential difference between the first electrode 61 and the second electrode 62 becomes equal to or higher than a prescribed threshold value, discharge is induced near the first electrode 61. Electrons and ions generated at this time are driven by an electric field, and when they collide with gas molecules, a kinetic momentum shifts to the gas molecules. Consequently, a plasma induced flow is generated near the first electrode 61.

For example, even in such a case where insulation resistance of the blade 42 made of an insulating material such as resin lowers due to rainy weather, stain, or the like, electric leakage does not occur from the first electrode 61 to a facility on the ground through the surface of the blade 42 because the first electrode 61 is grounded. This enables the operation excellent in safety.

(When Thundercloud Approaches)

Next, the operation at the time of the thundercloud approach when the thundercloud detecting device detects the information regarding the thundercloud approach will be described.

Figure 6:
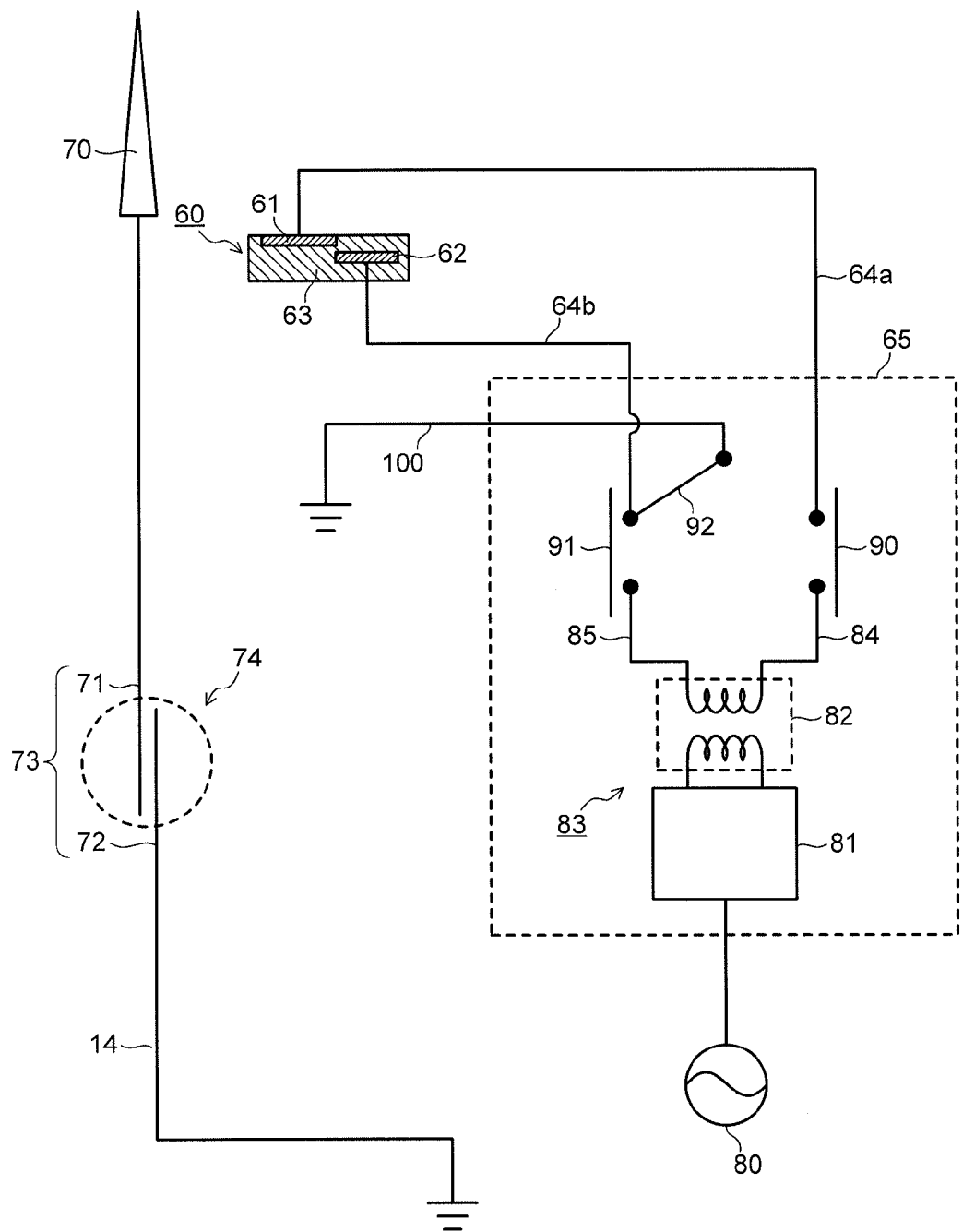
FIG. 6 is a diagram schematically showing the electric wiring system of the wind power generation system of the embodiment when a thundercloud is approaching.

FIG. 6 is a diagram schematically showing the electric wiring system of the wind power generation system 10 of the embodiment when a thundercloud is approaching.

When the thundercloud detecting device detects the information regarding the thundercloud approach, the switch 90 is turned off to electrically disconnect the cable line 64a from the output terminal 84 of the voltage applying part 83, and the switch 91 is turned off to electrically disconnect the cable line 64b from the output terminal 85 of the voltage applying part 83, as shown in FIG. 6. That is, this produces a state where the first electrode 61 of the airflow generation device 60 is electrically disconnected from the output terminal 84 of the voltage applying part 83 and the second electrode 62 is electrically disconnected from the output terminal 85 of the voltage applying part 83. Thus, when a thundercloud is approaching, the airflow generation device 60 is brought into a nonoperable state.

Further, the switch 92 electrically connected to the grounding conductor 100 is electrically connected to the cable line 64b. This produces a state where the second electrode 62 of the airflow generation device 60 is electrically connected to the grounding conductor 100.

Here, when a thundercloud approaches in the state of the electric wiring system set for the time of the normal operation shown in FIG. 5, there is a possibility that the first electrode 61 of the airflow generation device 60 operates as a lightning receiving part similarly to the receptor 70 because it is a grounded electrode exposed to an outer surface. The first electrode 61 of the airflow generation device 60 is not structured on assumption that it receives lightning unlike the receptor 70, and therefore, when it receives lightning and a large current passes therethrough, there is a possibility that the electrode melts or the dielectric in its vicinity is damaged.

For example, when a negatively-charged thundercloud approaches, positive electric charges are supplied from the ground, so that the receptors 70 and the first electrodes 61 each have a positive induced potential. Consequently, a stepped leader to which positively-charged streamers travel from edge portions of the first electrodes 61 is generated, which increases a probability of inducing lightning.

Therefore, setting the electric wiring system to the state shown in FIG. 6 when a thundercloud approaches makes it possible to set the second electrode 62 to the ground potential. When a negatively-charged thundercloud approaches in this case, the receptors 70 and the second electrodes 62 have a positive induced potential due to the supply of the positive electric charges from the ground. On the other hand, negative electric charges determined by a capacitance of the dielectrics 63 are induced in the first electrodes 61. As a result, electric fields generated by the thundercloud near the first electrodes 61 are weakened, so that the probability of lightning induction to the vicinity of the first electrodes 61 lowers.

In the receptors 70, since they have the positive induced potential, a stepped leader is generated and the probability of lightning induction increases. Since the receptors 70 to which lighting is likely to be induced and the first electrodes 61 to which lightning is unlikely to be induced can thus exist on the blade surface, lightning strike occurs on the receptors 70. Consequently, it is possible to prevent the occurrence of lightning strike to the first electrodes 61, which can prevent the first electrodes 61 and so on from melting due to the lightning strike.

As described above, according to the wind power generation system 10 of the embodiment, when the information regarding the thundercloud approach is detected, the electric wiring system is changed from the state of the electric wiring system set for the time of the normal operation to the state of the electric wiring system set for the time of the thundercloud approach, which can prevent lightning strike and passage of a large current to the airflow generation device 60. Therefore, it is possible to provide a wind power generation system having excellent safety.

(Lightning Strike Test)

Here, by using a scale model of a windmill blade, a lightning strike test was conducted in the aforesaid state of the electric wiring system set for the time of the normal operation (FIG. 5) and the aforesaid state of the electric wiring system set for the time of the thundercloud approach (FIG. 6).

A model blade whose length in the blade span direction extending from the root portion to the end portion of the blade 42 was 0.15 m was used. Note that a chord length of this model blade was 0.02 m. As the model blade, one made of FRP (Fiber Reinforced Plastics) was used.

Two airflow generation devices 60 were arranged in the blade span direction on a leading edge portion of the model blade, and receptors 70 were installed at a tip portion of the model blade. As the receptors 70 provided on the surfaces of the model blade, those in a circular shape each with a 20 mm diameter were used.

In the lightning strike test, the model blade was installed at a position whose height from a floor surface was 1 m, a negative thunder impulse voltage was applied to a charged rod installed above the model blade, and the numbers of times the lightning strike occurs on the first electrodes 61 of the airflow generation devices 60, the receptors 70, and the ground were examined. The lightning strike test was executed repeatedly in each of the state of the electric wiring system set for the time of the normal operation (FIG. 5) and the state of the electric wiring system set for the time of the thundercloud approach (FIG. 6).

Figure 7:
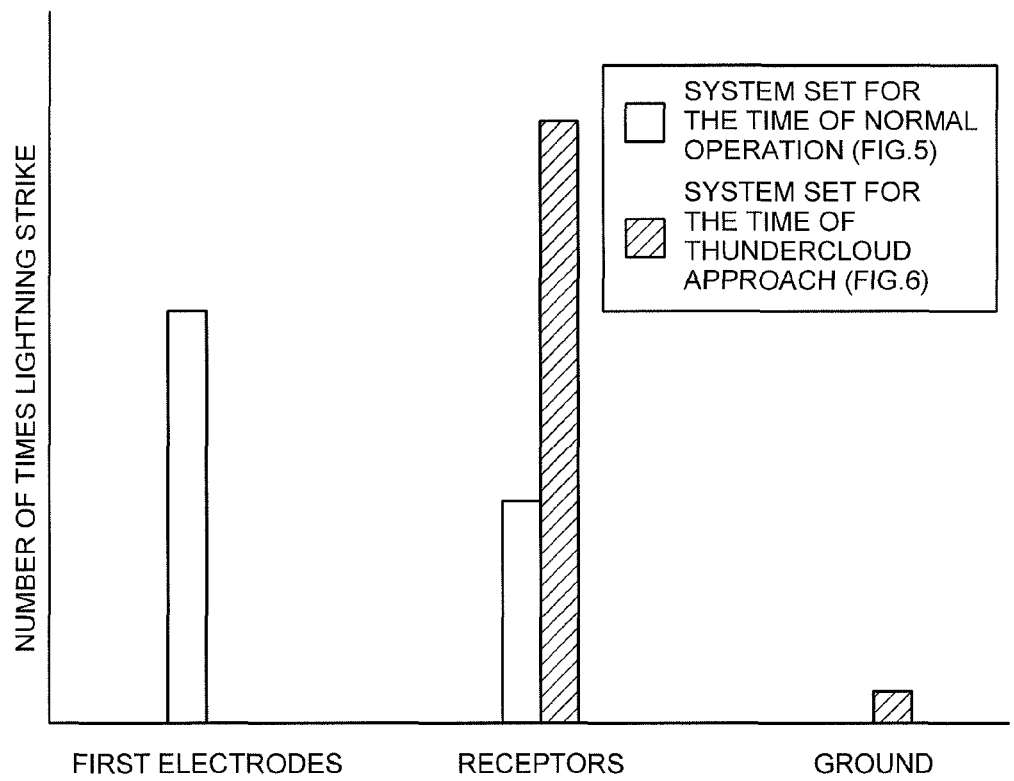
FIG. 7 is a diagram illustrating a result of a lightning strike test.

FIG. 7 is a diagram illustrating a result of the lightning strike test. As shown in FIG. 7, in the state of the electric wiring system set for the time of the thundercloud approach (FIG. 6), the lightning strike did not occur on the first electrodes 61. Moreover, as shown in FIG. 7, it has become apparent that, in the state of the electric wiring system set for the time of the thundercloud approach (FIG. 6), the number of times the lightning strike occurs on the first electrodes 61 is smaller than in the state of the electric wiring system set for the time of the normal operation (FIG. 5). From this result, it has been found out that it is possible to prevent the occurrence of the lightning strike to the first electrodes 61, by bringing the electric wiring system to the state set for the time of the thundercloud approach (FIG. 6).

According to the above-described embodiment, in a windmill including the airflow generation device on a blade, it is possible to prevent a lightning strike and passage of a large current to the airflow generation device, so that the windmill can have excellent safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wind power generation system, comprising:
a lightning protecting device including a lightning receiving part provided on a blade and a lightning conductor provided from the lightning receiving part to an underground via an interior of the blade and a windmill body to guide a current of lightning striking the lightning receiving part into the underground;
an airflow generation device including a first electrode provided on the blade and a second electrode apart from the first electrode via a dielectric and buried in the dielectric;
a voltage applying mechanism able to apply a voltage between the first electrode and the second electrode of the airflow generation device, able to electrically connect the first electrode to one terminal of a voltage applying part or a grounding conductor, and able to electrically connect the second electrode to another terminal of the voltage applying part or the grounding conductor; and
a thundercloud detecting device detecting information regarding thundercloud approach,
wherein, when the information regarding the thundercloud approach is detected by the thundercloud detecting device, the second electrode is electrically connected to the grounding conductor and the electrical connection of the first electrode and the second electrode to the terminals of the voltage applying part is cut off.

2. The wind power generation system according to claim 1, wherein the voltage applying mechanism includes: a first movable contact able to electrically connect the first electrode to the one terminal of the voltage applying part; a second movable contact able to electrically connect the second electrode to the other terminal of the voltage applying part; and a third movable contact able to electrically connect the first electrode or the second electrode selectively to the grounding conductor.

3. The wind power generation system according to claim 2, wherein, when the information regarding the thundercloud approach is not detected by the thundercloud detecting device, the first electrode is electrically connected to the one terminal of the voltage applying part by the first movable contact; the second electrode is electrically connected to the other terminal of the voltage applying part by the second movable contact; and the first electrode is electrically connected to the grounding conductor by the third movable contact.

4. The wind power generation system according to claim 1, wherein the thundercloud detecting device includes a voltage detecting device detecting information regarding a voltage increase of the lightning receiving part in accordance with the thundercloud approach.

5. The wind power generation system according to claim 2, wherein the thundercloud detecting device includes a voltage detecting device detecting information regarding a voltage increase of the lightning receiving part in accordance with the thundercloud approach.

6. The wind power generation system according to claim 3, wherein the thundercloud detecting device includes a voltage detecting device detecting information regarding a voltage increase of the lightning receiving part in accordance with the thundercloud approach.

7. The wind power generation system according to claim 1, wherein the thundercloud detecting device includes a current detecting device detecting information regarding a current generated in the lightning receiving part in accordance with a stepped leader.

8. The wind power generation system according to claim 2, wherein the thundercloud detecting device includes a current detecting device detecting information regarding a current generated in the lightning receiving part in accordance with a stepped leader.

9. The wind power generation system according to claim 3, wherein the thundercloud detecting device includes a current detecting device detecting information regarding a current generated in the lightning receiving part in accordance with a stepped leader.

10. The wind power generation system according to claim 1, wherein the thundercloud detecting device includes a receiving device receiving, by wire or by radio, the information regarding the thundercloud approach which information is output from an external part.

11. The wind power generation system according to claim 2,
wherein the thundercloud detecting device includes a receiving device receiving, by wire or by radio, the information regarding the thundercloud approach which information is output from an external part.

12. The wind power generation system according to claim 3,
wherein the thundercloud detecting device includes a receiving device receiving, by wire or by radio, the information regarding the thundercloud approach which information is output from an external part.

* * * * *